(12) United States Patent
Cosatto et al.

(10) Patent No.: US 12,198,331 B2
(45) Date of Patent: Jan. 14, 2025

(54) MULTI-SCALE TUMOR CELL DETECTION AND CLASSIFICATION

(71) Applicant: NEC Laboratories America, Inc., Princeton, NJ (US)

(72) Inventors: Eric Cosatto, Red Bank, NJ (US); Kyle Gerard, Princeton, NJ (US)

(73) Assignee: NEC Corporation, Tokyo (JP)

( * ) Notice: Subject to any disclaimer, the term of this patent is extended or adjusted under 35 U.S.C. 154(b) by 718 days.

(21) Appl. No.: 17/380,207

(22) Filed: Jul. 20, 2021

(65) Prior Publication Data

US 2022/0028068 A1    Jan. 27, 2022

Related U.S. Application Data

(60) Provisional application No. 63/062,526, filed on Aug. 7, 2020, provisional application No. 63/055,470, filed on Jul. 23, 2020.

(51) Int. Cl.
*G06T 7/00* (2017.01)
*G06F 18/214* (2023.01)
*G06F 18/2415* (2023.01)
*G06T 7/149* (2017.01)
*G06V 10/25* (2022.01)

(52) U.S. Cl.
CPC .......... *G06T 7/0012* (2013.01); *G06F 18/214* (2023.01); *G06F 18/2415* (2023.01); *G06T 7/149* (2017.01); *G06V 10/25* (2022.01); *G06T 2207/30096* (2013.01)

(58) Field of Classification Search
CPC ....... G06T 7/0012; G06T 7/149; G06V 10/25; G06F 18/214; G06F 18/2415
See application file for complete search history.

(56) References Cited

U.S. PATENT DOCUMENTS

2011/0206261 A1\* 8/2011 Huo ................ G16H 30/20
382/132
2012/0066018 A1\* 3/2012 Piersol ................ G06Q 10/10
705/7.14

(Continued)

OTHER PUBLICATIONS

Cosatto, Eric, et al. "A Multi-Scale Conditional Deep Model for Tumor Cell Ratio Counting", InMedical Imaging 2021: Digital Pathology, International Society for Optics and Photonics. Feb. 15, 2021, pp. 1-12.

(Continued)

*Primary Examiner* — Kevin Ky
(74) *Attorney, Agent, or Firm* — Joseph Kolodka

(57) ABSTRACT

Methods and systems for training a machine learning model include generating pairs of training pixel patches from a dataset of training images, each pair including a first patch representing a part of a respective training image, and a second patch, centered at the same location as the first, representing a larger part of the training image, being resized to a same size of as the first patch. A detection model is trained using the first pixel patches, to detect and locate cells in the images. A classification model is trained using the first pixel patches, to classify cells according to whether the detected cells are cancerous, based on cell location information generated by the detection model. A segmentation model is trained using the second pixel patches, to locate and classify cancerous arrangements of cells in the images.

14 Claims, 7 Drawing Sheets

(56) References Cited

U.S. PATENT DOCUMENTS

| | | | |
|---|---|---|---|
| 2014/0294272 A1* | 10/2014 | Madabhushi | G06V 20/695 |
| | | | 382/131 |
| 2017/0053562 A1* | 2/2017 | Bova | G09B 23/28 |
| 2017/0091937 A1* | 3/2017 | Barnes | G06V 10/771 |
| 2018/0333140 A1* | 11/2018 | Wodlinger | A61B 8/488 |
| 2020/0069275 A1* | 3/2020 | Stavros | G06T 7/77 |
| 2020/0211189 A1* | 7/2020 | Yip | G06T 7/11 |
| 2020/0251213 A1* | 8/2020 | Tran | G06N 20/00 |
| 2020/0258223 A1* | 8/2020 | Yip | G06F 18/21 |
| 2020/0273161 A1* | 8/2020 | Von Neubeck | G06T 7/143 |
| 2020/0282234 A1* | 9/2020 | Folkerts | A61N 5/1031 |
| 2020/0394794 A1* | 12/2020 | Park | G06T 7/0012 |
| 2021/0004650 A1* | 1/2021 | Frank | G06F 18/2415 |
| 2021/0081633 A1* | 3/2021 | Schie | G06T 7/11 |
| 2021/0153838 A1* | 5/2021 | Nien | G16H 50/20 |

OTHER PUBLICATIONS

Xie, Weidi, et al. "Microscopy Cell Counting and Detection with Fully Convolutional Regression Networks", Computer methods in biomechanics and biomedical engineering: Imaging & Visualization. May 4, 2018, pp. 1-8.

* cited by examiner

MULTI-SCALE TUMOR CELL DETECTION AND CLASSIFICATION

RELATED APPLICATION INFORMATION

This application claims priority to U.S. Provisional Patent Application No. 63/055,470, filed on Jul. 23, 2020, and to U.S. Provisional Patent Application No. 63/062,526, filed on Aug. 7, 2020, incorporated herein by reference in their entirety.

BACKGROUND

Technical Field

The present invention relates to tumor cell detection and classification, and, more particularly, training a machine learning model using information at different magnification scales to assess tumor cell ratio in tumors.

Description of the Related Art

Obtaining a tumor cell ratio, which is a measure of cancer aggressiveness, includes counting a number of cells in the tumor area. For some tissue samples, the number of cells can be in the millions. Counting so many cells is not feasible for a human to perform, and estimation techniques tend to be inaccurate.

SUMMARY

A method of training a machine learning model includes generating pairs of training pixel patches from a dataset of training images, each pair including a first patch representing a part of a respective training image, and a second patch, centered at the same location as the first, representing a larger part of the training image, being resized to a same size of as the first patch, using a hardware processor. A detection model is trained using the first pixel patches in the pairs of training patches, to detect and locate cells in the images. A classification model is trained using the first pixel patches in the pairs of training patches, to classify cells according to whether the detected cells are cancerous, based on cell location information generated by the detection model. A segmentation model is trained using the second pixel patches in the pairs of training patches, to locate and classify cancerous arrangements of cells in the images.

A method of detecting cancer includes generating, from a scanned tissue sample, a pair of input images, a first input image representing a part of the scanned tissue sample, and a second input image, centered at the same location as the first, representing a larger part of the sample and resized to a size of the first input image, using a hardware processor. Cells are located within the first input image using a detection model. Detected cells in the first input image are classified, using a classification model, to determine a respective cancer probability for each cell, based on cell location information generated by the detection model. The second input image is segmented, using a segmentation model, to assign a cancerous-structure probability to arrangements of cells. An updated cancerous probability of each detected cell in the first pixel patch is determined, using a weighted sum of the cancer probability for the cell and the cancerous-structure probability. A tumor cell ratio is determined based on the updated cancerous probability of each detected cell in the first pixel patch.

A system for training a machine learning model includes a hardware processor and a memory that stores a computer program product. When executed by the hardware processor, the computer program product causes the hardware processor to generate pairs of training pixel patches from a dataset of training images, each pair including a first patch representing a part of a respective training image, and a second patch, centered at the same location as the first, representing a larger part of the training image, being resized to a same size of as the first patch, to train a detection model using the first pixel patches in the pairs of training patches, to detect and locate cells in the images, to train a classification model using the first pixel patches in the pairs of training patches, to classify cells according to whether the detected cells are cancerous, based on cell location information generated by the detection model, and to train a segmentation model using the second pixel patches in the pairs of training patches, to locate and classify cancerous arrangements of cells in the images.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

To identify a tumor cell ratio (TCR), normal and tumor cells may be automatically counted for a given area of a tissue sample. High-magnification images may be used to show details of individual cells, while lower-magnification images reveal how cells are arranged in larger structures, such as glands. Cancerous cells can be contrasted from healthy cells by their individual cell features, by the way they arrange themselves, or both.

To detect cancerous cells, a machine learning model may be used that includes two deep neural networks. A first network is trained to segment tumor areas at a relatively low magnification, allowing its input field of view to encompass enough tissue structure to detect cancerous features that affect the arrangement of cells. A network second is trained at a relatively high magnification, allowing it to clearly distinguish each individual cell in its field of view. The latter neural network can both detect and classify each cell as being normal or cancerous. By combining the segmentation of the first neural network with the detection and classification of the second neural network, a count of both normal and cancerous cells can be determined, even in situations where individual cancer cells appear benign but are part of a malignant arrangement, and situations where individual normal cells appear cancerous, but are part of a healthy arrangement of cells.

The inputs to the machine learning model may include a slide file, for example generated by a whole-slide imaging (WSI) scanner. The slide image may be split into a grid of tiles to best fit the processing hardware. The output may include reports of the locations of all cancerous cells and normal cells, as well as the TCR for each tile, and the aggregated TCR for specified areas or the entire slide. Visuals can include color scaling for each tile, for example with red indicating a relatively high ratio of tumor cells and blue indicating a low ratio of tumor cells. Each individual tumor cell may be highlighted to indicated where tumor cells are proliferating.

Figure 1:
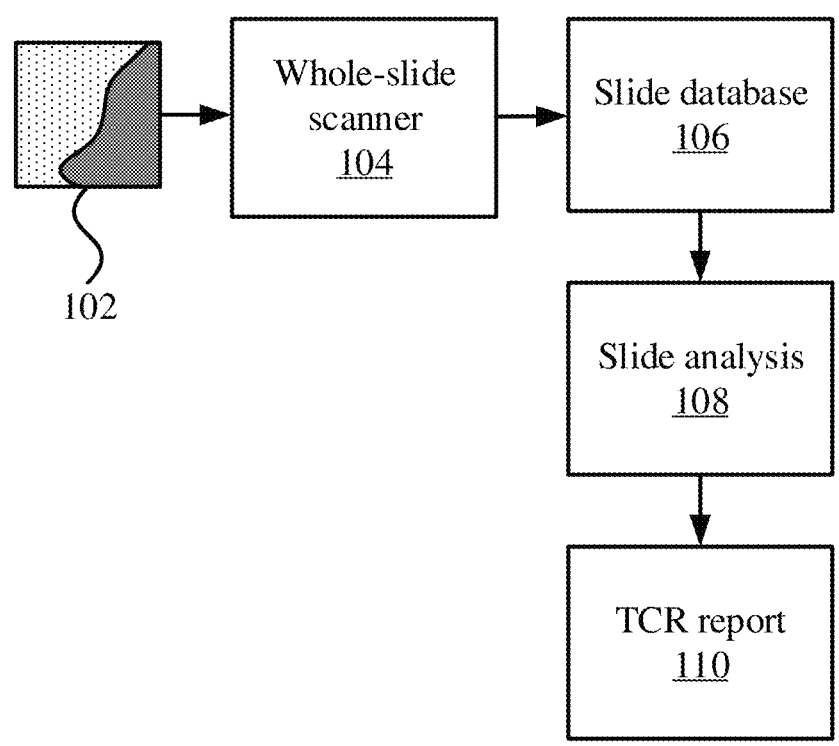
FIG. 1 is a block diagram of the processing and analysis of a tissue sample slide to determine whether the tissue sample is cancerous, in accordance with an embodiment of the present invention.

Referring now in detail to the figures in which like numerals represent the same or similar elements and initially to FIG. 1, a system for analyzing tissue samples and providing TCR reports is shown. A tissue sample 102 is taken and put on a slide. The slide is scanned by a whole-slide scanner, producing a slide image, which is stored in a slide database 106.

Slide analysis 108 uses a dual-channel machine learning model, which considers the slide images at a low resolution and a high resolution. The slide analysis 108 may split each image into processing tiles, which may be performed according to a regular grid and/or may be determined according to a user's indication of sections of the slide image to focus on.

The slide analysis 108 may generate a TCR report 110 that characterizes the information gleaned from the slide 102, for example including TCR, locations of cancerous cells, etc. This TCR report 110 may be used by medical professionals to help diagnose a patient, to identify a type and extent of a cancer, to identify a course of treatment, etc.

Figure 2:
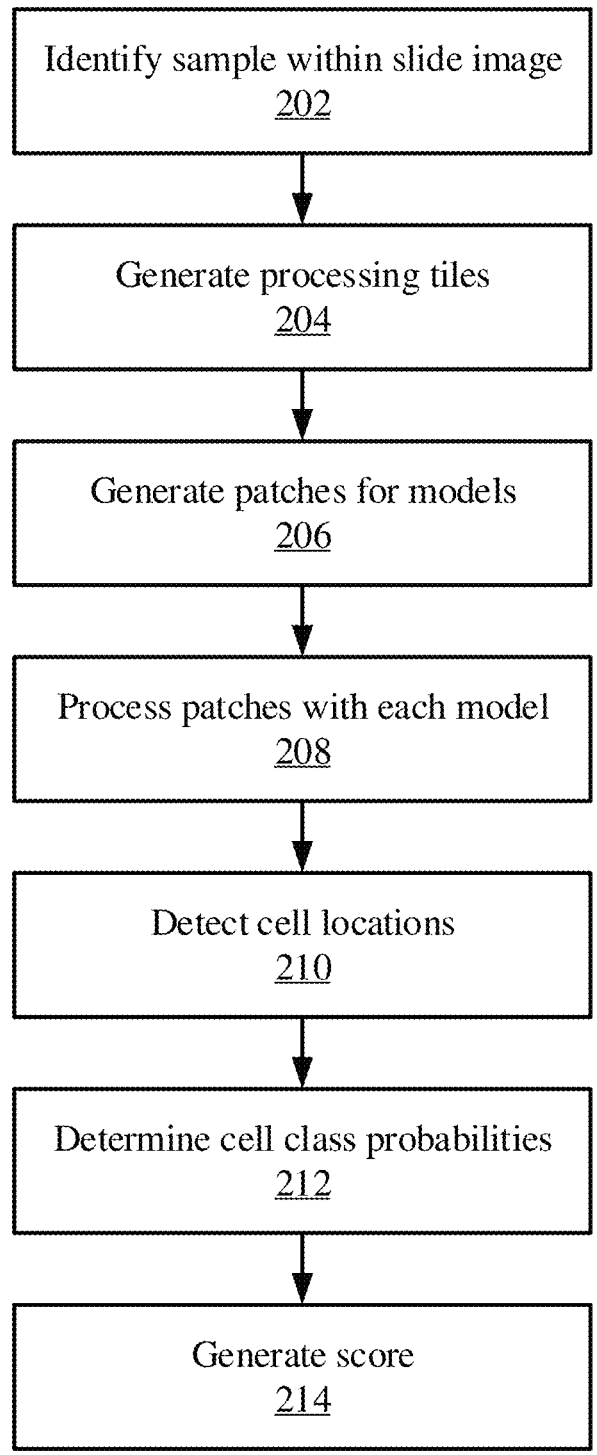
FIG. 2 is a block/flow diagram of a method for analyzing a tissue sample to determine whether the tissue sample is cancerous, in accordance with an embodiment of the present invention.

Referring now to FIG. 2, a method of performing analysis is shown. Block 202 identifies a sample within a slide image. This may include, for example, analyzing the whole slide at a relatively low resolution to identify the sample via, e.g., border detection. This may also include identifying marks made by a user that indicate an area of the image to focus on, including marks made using a marker on the slide 102 itself, or marks made digitally on the slide image.

Block 204 generates processing tiles from the identified sample. This may include, for example, generating a regular grid of square regions, though it should be understood that any appropriate subdivision of the image may be used. The user may additionally eliminate a portion of the tiles to prevent further analysis of those regions. The tiles may be used to split the workload between multiple processors or processor cores, thereby increasing the speed of processing.

Block 206 generates patches for analysis by the machine learning models. Pixels may be extracted from the processing tiles of the slide image at appropriate resolutions, reflecting different degrees of magnification. These pixel patches are supplied as inputs to the neural network models in block 208.

As will be described in greater detail below, multiple different neural network models may be used. A first model may operate at a low resolution, and perform segmentation of structures within the slide image. A second model may operate at a high resolution, and may perform detection of individual cells. A third model may operate at a high resolution, and may perform classification of the detected cells. The second and third models may be combined. Each model operates on its respective pixel patches to generate respective outputs, including detected cell positions, classifications for the detected cells, and regions of the slide image associated with distinct structures, with classifications of the structures.

A final score for each cell may be determined at block 214, for example as a weighted sum of the probabilities of the cells and the structures. The weights may be hyperparameters of the model. In the case of combining 2 scores, a single hyperparameter a may be used, and the final score S may be determined as follow: $S=\alpha*s_1+(1-\alpha)*s_2$, where $s_1$ and $s_2$ are outputs of the low-resolution and high-resolution model for a particular cell. The final score is used to determine if a cell is a tumor cell or a non-tumor cell, based on a threshold T as follow: if $S<T$, the cell is non-tumor, otherwise it is a tumor cell. The threshold is obtained during training of the model. A final report may be generated to collect cell information and to calculate the TCR for each processing tile, and for the entire slide or user-selected regions. The report may include any appropriate level of detail, and may include any information derived from the cell information, such as local and global TCR, as well as a statement of the likelihood that the slide shows cancerous tissue.

Figure 3:
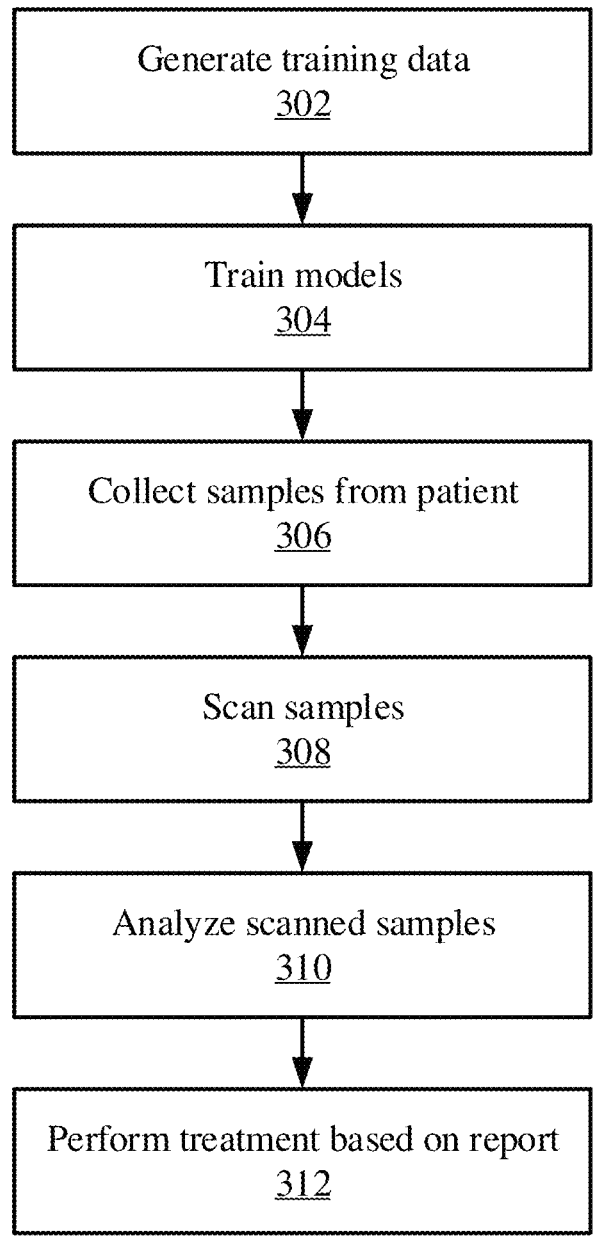
FIG. 3 is a block/flow diagram of a method for training a machine learning model, analyzing tissue samples, and performing treatment, in accordance with an embodiment of the present invention.

Referring now to FIG. 3, an overall process is shown. Block 302 generates training data for the machine learning model. This training data may include a set of regions of interest from a set of patients' scanned tissue sample slides, representative of a particular condition as encountered in clinical practice. The regions of interest may be annotated by domain experts, such as pathologists, to identify the location of all cells, including identification of regions that include a tumor. The locations of cells may be labeled by respective points at the center of each cell nucleus, while tumor regions may be delineated by freehand contours.

For each image in the training data, pairs of pixel patches may be generated. It is specifically contemplated that the pixel patches may be square, though other shapes are also contemplated. The first pixel patch may be sampled at a random (x,y) position in the image and a given size ($sz_1$). The second pixel patch is sampled from the same position, but with a larger size ($sz_2$) and then rescaled to the first patch's size. The first patch may be annotated, e.g., with ground-truth labels obtained by a domain expert, such as a pathologist, identifying the location of the center of cells' nucleuses and identifying the location of cancerous cells' nucleuses. The second patch may be annotated, e.g., with ground truth labels marking tumor regions using a contour that outlines the tumor region.

Block 304 trains the models, using the generated training patches. The detection model may use a deep regression neural network model to predict a map of Gaussian peaks, with each peak being centered at the cell label. After training, the detection model may provide a regression map of an input image, with target Gaussian peaks at the center of each cell. Peak detection may transform the regression map into a list of cell positions. For the classification model, a deep regression neural network model may be used to identify Gaussian peaks for only cancerous cells. Using the list of cell positions, the classification model may be accessed at the location of each cell to obtain the probability of a cell being cancerous. For the segmentation model, a regression map may be generated, where an area identified as a tumor takes a value of 1, for example, while non-cancerous regions may have an exemplary value of 0. For each area identified as being tumorous, a probability of being a tumor may be determined.

Block 306 collects tissue samples from a patient. In some cases, this tissue sample may represent a biopsy sample of suspected cancerous tissue. The tissue sample may be put onto a slide, which may be scanned using whole-slide imaging in block 308.

Block 310 may then analyze the scanned samples, for example as described above in relation to FIG. 2. A report may be generated in block 312 based on the analysis output. In particular, the high-resolution information that shows individual cancer cells may be combined with the low-resolution information that shows the overall arrangement of multiple cells, to provide an indication of whether a particular slide image includes cancerous tissue. The report may also include other information, including treatment recommendations, prognosis, an assessment of malignancy, etc.

Figure 4:
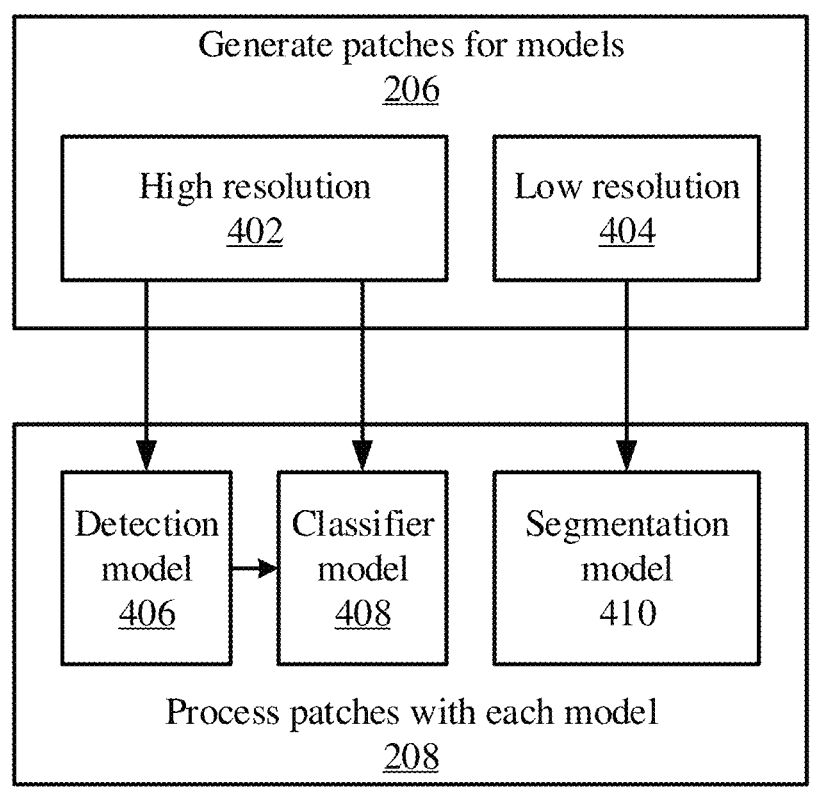
FIG. 4 is a block/flow diagram showing additional detail on how pixel patches are used by the machine learning models, in accordance with an embodiment of the present invention.

Referring now to FIG. 4, additional detail is shown on how the pixel patches generated by block 206 are processed in block 208. The patches are generated at a high resolution 402 and at a low resolution 404. The resolution used for the detection/classification model may be sufficient for the model to be able to distinguish individual cells. For example, a resolution between 1 and 2 pixels per micron (ppm) may be used as the high resolution 402. For the segmentation, a resolution between 0.2 and 1 ppm may be sufficient for the low resolution 404, as only the structure of cell is important. The size of patches in pixels may be the same between all models. For example, an image patch size of 300×300 pixels would correspond to a tissue patch of 150×150 microns at a resolution of 2 ppm (high-resolution), and 600×600 microns at a resolution of 0.5 ppm (low-resolution).

High-resolution patches 402 are used by the detection model 406 and the classification model 408. Additionally, classifier model 408 may use cell location information output by the detection model 406 to generate probabilities that each cell is cancerous. The low-resolution pixel patches 404 are used by the segmentation model 410 to identify regions of the slide image which reflect cancerous cell arrangements.

The models may have a deep neural network architecture, referred to as fully-convolutional. These models may be implemented as regression models that generate one or more output map(s) based on an input image. The size of the input image is not fixed, and as it gets larger than the minimum patch size, so does the output map. Hence, a full processing tile can be processed in one shot by the model. One such architecture is called U-Net. The detection and the classification models may operate at the same resolution, and may be implemented by a single fully-convolutional model with two output maps. The segmentation model may also be omitted to speed-up computation by setting the hyperparameter a to zero.

Figure 5:
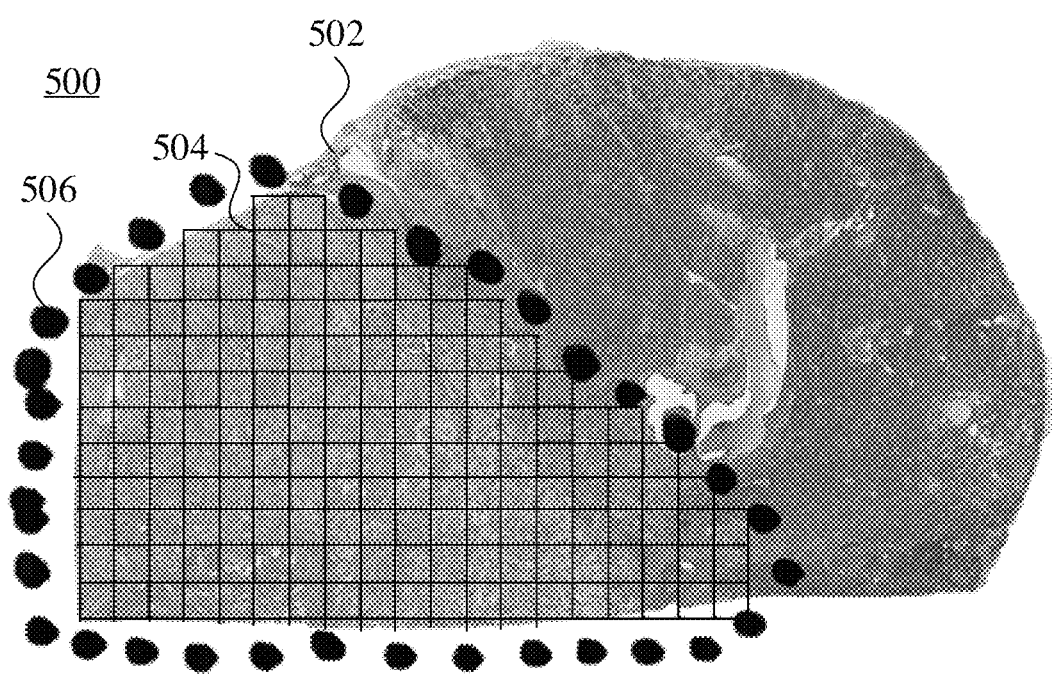
FIG. 5 is a diagram showing a relationship between a scanned tissue sample and tiles within a user-defined area, in accordance with an embodiment of the present invention.

Referring now to FIG. 5, an exemplary slide image 500 is shown after the processing tiles are generated in block 204. The slide image 500 includes the scanned tissue sample 502. A number of tiles 504 have been identified within the image, in this case by applying a grid over the scanned tissue image 502, with pixels falling within each respective grid making up a respective tile. A set of markers 506 are also shown, having been provided by a human operator, to limit the tiles, such that tiles 504 are only determined within a boundary that is established by the markers 506.

Each tile 504 may be separately processed, for example using parallel processing across multiple processors or processor cores. The total number of tiles may be divided by the number of available processing threads to form sets of tiles. Each set may be processed in serial by a respective thread.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs).

These and other variations of a hardware processor subsystem are also contemplated in accordance with embodiments of the present invention.

Figure 6:
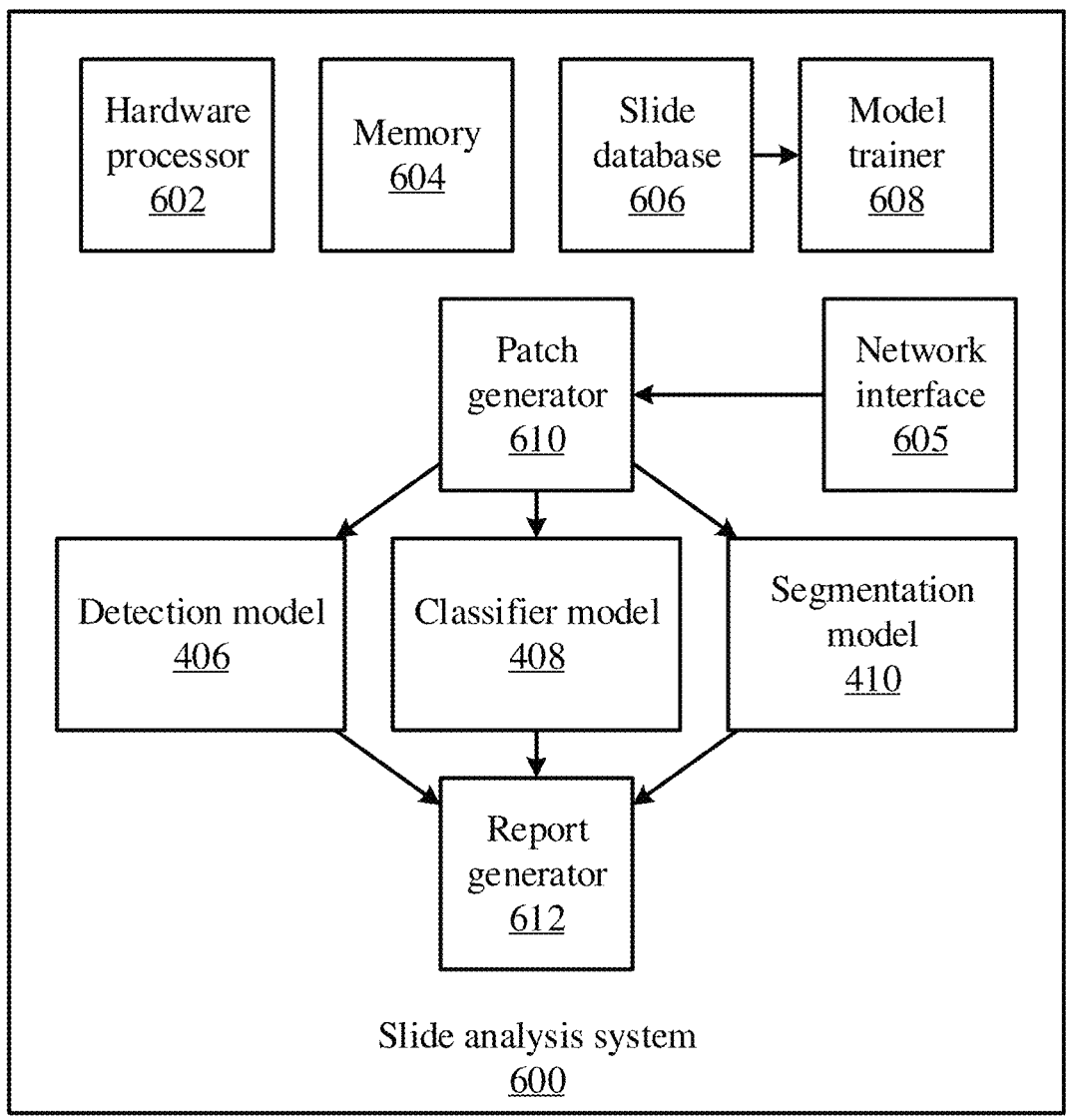
FIG. 6 is a block diagram of a slide analysis system that determines whether tissue sample images represent cancerous cells, in accordance with an embodiment of the present invention.

Referring now to FIG. 6, a slide analysis system 600 is shown. The system 600 includes a hardware processor 602 and memory 604. The system 600 may include a number of functional modules, which may be implemented as software that is stored in the memory 604 and that is executed by the hardware processor 602. In some cases, some of the functional modules may be implemented as discrete hardware components, for example in the form of ASICs or FPGAs.

A slide database 606 may be stored in the memory 604, and may be used by a model trainer 608 to train the detection model 406, the classifier model 408, and the segmentation model 410, as described above. The slide database 606 may be made up of images that have been scanned and annotated, and may be used to generate pixel patches at different resolutions.

A network interface 605 receives a new slide image by any appropriate wired or wireless communications medium or protocol. For example, the new slide image may be received from a whole-slide scanner 104. Any appropriate type of interface may be implemented, including a general purpose computer network interface or a dedicated interface for the whole-slide scanner 104.

The new slide image is processed by patch generator 610, which may identify processing tiles and may divide the new slide image into pixel patches at appropriate resolutions for the models. The detection model 406 and classifier model 408 process the pixel patches at a high resolution, while the segmentation model 410 processes the pixel patches at a low resolution. Each model generates a respective output, and these outputs are combined at the report generator to generate a report regarding the new slide image.

An artificial neural network (ANN) is an information processing system that is inspired by biological nervous systems, such as the brain. The key element of ANNs is the structure of the information processing system, which includes a large number of highly interconnected processing elements (called "neurons") working in parallel to solve specific problems. ANNs are furthermore trained using a set of training data, with learning that involves adjustments to weights that exist between the neurons. An ANN is configured for a specific application, such as pattern recognition or data classification, through such a learning process.

Figure 7:
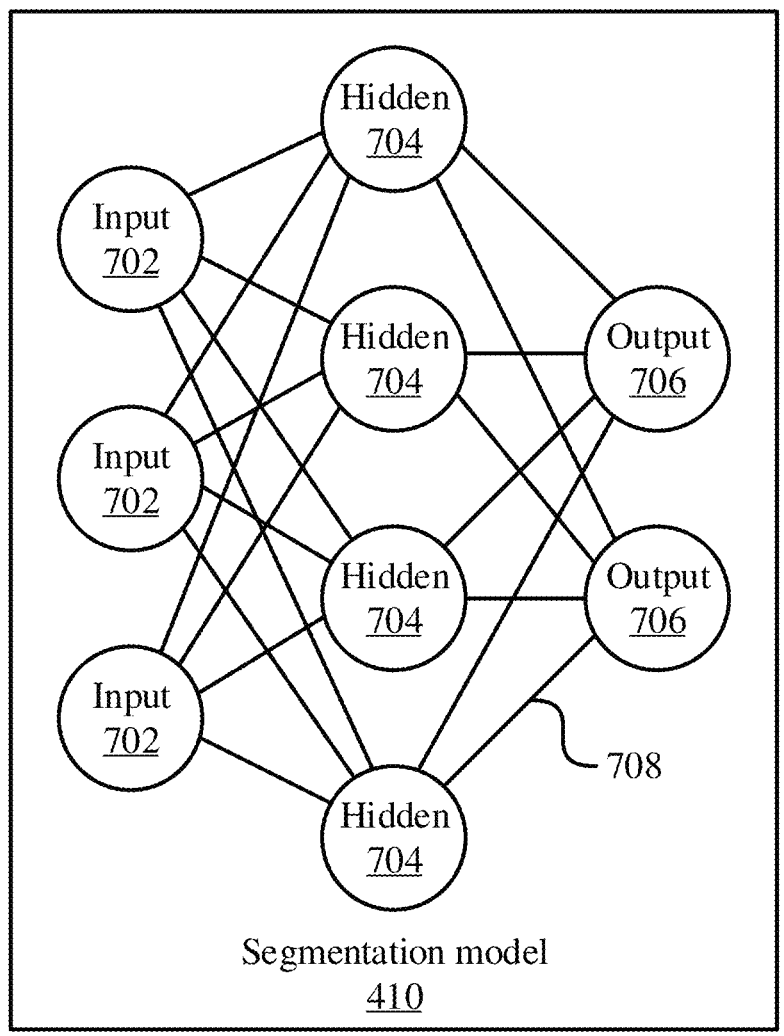
FIG. 7 is a block diagram illustrating a machine learning model, in accordance with an embodiment of the present invention.

Referring now to FIG. 7, a generalized diagram of a neural network is shown. Although a specific structure of an ANN is shown, having three layers and a set number of fully connected neurons, it should be understood that this is intended solely for the purpose of illustration. In practice, the present embodiments may take any appropriate form, including any number of layers and any pattern or patterns of connections therebetween.

ANNs demonstrate an ability to derive meaning from complicated or imprecise data and can be used to extract patterns and detect trends that are too complex to be detected by humans or other computer-based systems. The structure of a neural network is known generally to have input neurons 702 that provide information to one or more "hidden" neurons 704. Connections 708 between the input neurons 702 and hidden neurons 704 are weighted, and these weighted inputs are then processed by the hidden neurons 704 according to some function in the hidden neurons 704. There can be any number of layers of hidden neurons 704, and as well as neurons that perform different functions. There exist different neural network structures as well, such as a convolutional neural network, a maxout network, etc., which may vary according to the structure and function of the hidden layers, as well as the pattern of weights between the layers. The individual layers may perform particular functions, and may include convolutional layers, pooling layers, fully connected layers, softmax layers, or any other appropriate type of neural network layer. Finally, a set of output neurons 706 accepts and processes weighted input from the last set of hidden neurons 704.

This represents a "feed-forward" computation, where information propagates from input neurons 702 to the output neurons 706. Upon completion of a feed-forward computation, the output is compared to a desired output available from training data. The error relative to the training data is then processed in "backpropagation" computation, where the hidden neurons 704 and input neurons 702 receive information regarding the error propagating backward from the output neurons 706. Once the backward error propagation has been completed, weight updates are performed, with the weighted connections 708 being updated to account for the received error. It should be noted that the three modes of operation, feed forward, back propagation, and weight update, do not overlap with one another. This represents just one variety of ANN computation, and that any appropriate form of computation may be used instead.

To train an ANN, training data can be divided into a training set and a testing set. The training data includes pairs of an input and a known output. During training, the inputs of the training set are fed into the ANN using feed-forward propagation. After each input, the output of the ANN is compared to the respective known output. Discrepancies between the output of the ANN and the known output that is associated with that particular input are used to generate an error value, which may be backpropagated through the ANN, after which the weight values of the ANN may be updated. This process continues until the pairs in the training set are exhausted.

After the training has been completed, the ANN may be tested against the testing set, to ensure that the training has not resulted in overfitting. If the ANN can generalize to new inputs, beyond those which it was already trained on, then it is ready for use. If the ANN does not accurately reproduce the known outputs of the testing set, then additional training data may be needed, or hyperparameters of the ANN may need to be adjusted.

ANNs may be implemented in software, hardware, or a combination of the two. For example, each weight 708 may be characterized as a weight value that is stored in a computer memory, and the activation function of each neuron may be implemented by a computer processor. The weight value may store any appropriate data value, such as a real number, a binary value, or a value selected from a fixed number of possibilities, that is multiplied against the relevant neuron outputs.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for detecting cancer, comprising:
generating, from a scammed tissue sample, a pair of input images, a first input image representing a part of the scanned tissue sample, and a second input image, centered at the same location as the first, representing a larger part of the sample and resized to a size of the first input image, using a hardware processor;
locating cells within the first input image using a detection model;
training a classification model with training data, wherein the training data includes an annotated set of regions of interest from a set of patients' scanned tissue sample slides, representative of a particular condition as encountered in clinical practice;
classifying detected cells in the first input image, using the classification model, to determine a respective cancer probability for each cell, based on cell location information generated by the detection model:
segmenting the second input image, using a segmentation model, to assign a cancerous-structure probability to arrangements of cells;
determining an updated cancerous probability of each detected cell in a first pixel patch, using a weighted sum of the cancer probability for each cell and the cancerous-structure probability;
determining a tumor cell ratio based on the updated cancerous probability of each detected cell in the first pixel patch;
indicating a type and extent of a cancer based on the tumor cell ratio; and
treating the cancer in accordance with the identified type and extent.

2. The method of claim 1, wherein the tumor cell ratio compares a number of healthy cells to a number of cancerous cells.

3. The method of claim 1, wherein the detection model outputs a density map of Gaussian peaks, each centered at a respective cell.

4. The method of claim 1, wherein the classification model outputs a density map of Gaussian peaks, each centered at a respective cancerous cell.

5. The method of claim 1, wherein the segmentation model outputs a regression map that identifies areas that are cancerous.

6. The method of claim 1, wherein a cancer probability for each cell, determined by the classification model, is added to a cancerous structure probability, determined by the segmentation model, in a weighted sum to determine an updated cancerous probability for each cell.

7. The method of claim 1, wherein the detection model, the classification model, and the segmentation model are implemented as fully-convolutional neural network models.

8. A system for detecting cancer, comprising:
a hardware processor; and
a memory that stores a computer program which, when executed by the hardware processor, causes the hardware processor to:
generate, from a scanned tissue sample, a pair of input images, a first input image representing a part of the scanned tissue sample, and a second input image, centered at the same location as the first, representing a larger part of the sample and resized to a size of the first input image;
locate cells within the first input image using a detection model;
train a classification model with training data, wherein the training data includes an annotated set of regions of interest from a set of patients' scanned tissue sample slides, represent ative of a particular condition as encountered in clinical practice;
classify detected cells in the first input image, using the classification model, to determine a respective cancer probability for each cell, based on cell location information generated by the detection model;

segment the second input image, using a segmentation model, to assign a cancerous-structure probability to arrangements of cells;

determine an updated cancerous probability of each detected cell in a first pixel patch, using a weighted sum of the cancer probability for each cell and the cancerous-structure probability;

determine a tumor cell ratio based on the updated cancerous probability of each detected cell in the first pixel patch;

indicate a type and extent of a cancer based on the tumor cell ratio; and trigger treatment of the cancer in accordance with the identified type and extent.

9. The system of claim 8, wherein the tumor cell ratio compares a number of healthy cells to a number of cancerous cells.

10. The system of claim 8, wherein the detection model outputs a density map of Gaussian peaks, each centered at a respective cell.

11. The system of claim 8, wherein the classification model outputs a density map of Gaussian peaks, each centered at a respective cancerous cell.

12. The system of claim 8, wherein the segmentation model outputs a regression map that identifies areas that are cancerous.

13. The system of claim 8, wherein a cancer probability for each cell, determined by the classification model, is added to a cancerous structure probability, determined by the segmentation model, in a weighted sum to determine an updated cancerous probability for each cell.

14. The system of claim 8, wherein the detection model, the classification model, and the segmentation model are implemented as fully-convolutional neural network models.

* * * * *